Oct. 24, 1933.  F. R. LONG  1,932,348
COMBINATION CHECK VALVE AND UNION
Filed Feb. 7, 1933
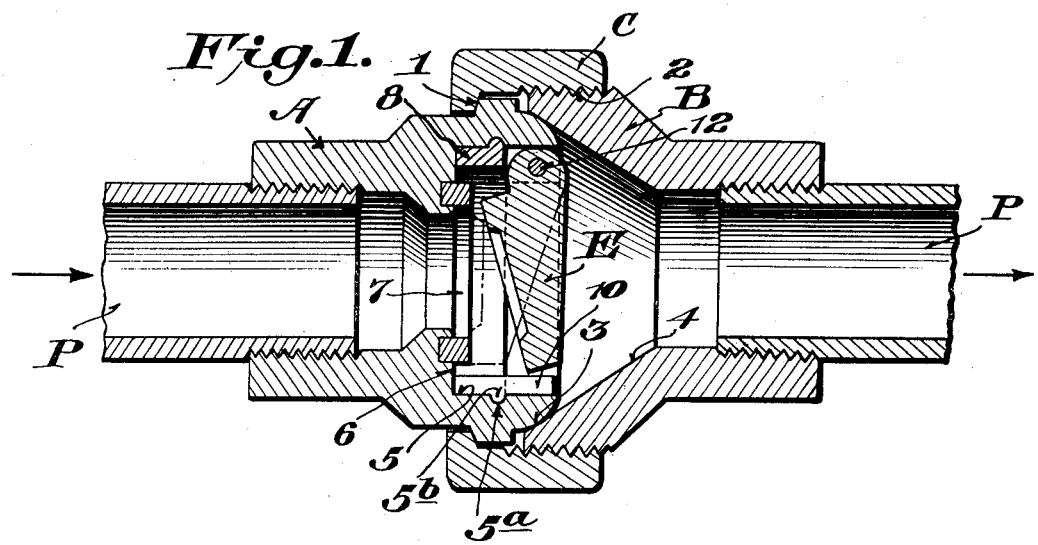
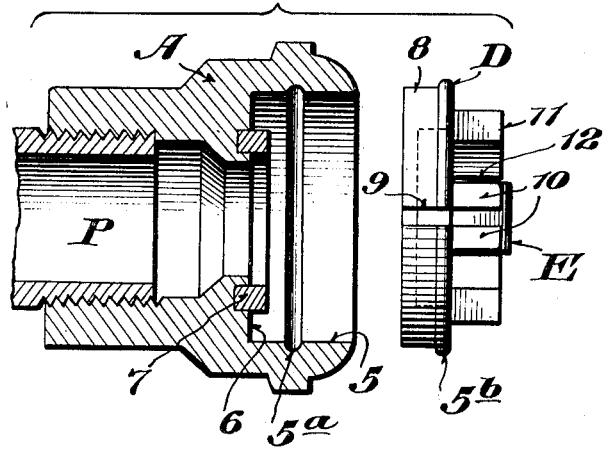
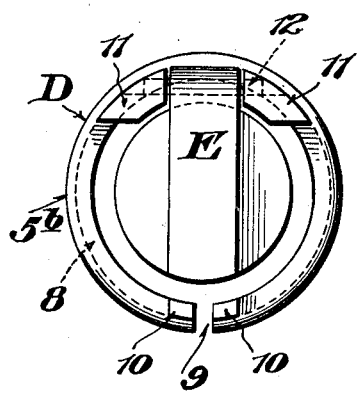
Inventor
Fred R. Long,
By
Attorney Patented Oct. 24, 1933

1,932,348

UNITED STATES PATENT OFFICE 1,932,348

COMBINATION CHECK VALVE AND UNION

Fred R. Long, Catawissa, Pa.

Application February 7, 1933. Serial No. 655,671

2 Claims. (Cl. 137—69)

This invention relates to improved fittings for pipe lines, and more particularly to a novel combined check valve and union.

Heretofore, the general practice in connection with fluid pipe lines, requiring the use of check valves, has been to use check valve installations separate from the unions. That is to say, wherever there is a check valve in the line, there is or should be a union close to it, not only for the purpose of easy assembly, but in case it is necessary to take the valve out for repairs. Therefore, this practice is not only expensive in view of the number of devices required but also in renewing or repairing a check valve the time consumed in pursuing separate operations of disconnecting the union and then disconnecting the valve is undesirable and generally unsatisfactory from the standpoint of the number of manual operations involved.

Accordingly, the present invention has primarily in view the provision of a novel combined check valve and union which effects the saving of one fitting and the space otherwise required for placing a separate check valve unit in the line, as well as the manual operations required. In other words, the present invention provides a construction which is cheaper to install; provides fewer joints subject to leakage; avoids the necessity of having openings in the valve body; useful in either a vertical or a horizontal position; and effects a saving of time.

A further object of the invention is to provide a novel valve mounting which facilitates removal of the valve for regrinding or other repairs.

With the above and other objects in view which will more readily appear as the nature of the invention is better understood, the invention consists in the novel features of construction, combination and arrangement of parts as will be hereinafter more fully described, illustrated in the accompanying drawing and defined in the appended claims.

A preferred and practical embodiment of the invention is shown in the accompanying drawing, in which:

Figure 1 is a longitudinal sectional view of the improved construction fitted into a pipe line.

Figure 2 is a detail longitudinal section of the valve section of the union showing the valve carrier in elevation.

Figure 3 is a plan view of the valve carrier and valve.

Similar reference characters designate corresponding parts throughout the several figures of the drawing.

Referring to the drawing, it will be observed that the present device includes in its organization the pipe union members or sections A and B adapted to be connected with the pipes P, the said members or sections being assembled or joined by the nut C. This nut has a swivel engagement as indicated at 1 with the section A and a threaded engagement as indicated at 2 with the section B.

The section A is formed as at 3 with a rounded or beveled bearing shoulder adapted to fit within the flaring wall 4 of the section B so that when the nut C is tightened a fluid tight joint will be formed between the shoulder and wall. The section A is also recessed to provide a side wall 5 and a bottom wall 6. The bottom wall is fitted with a removable valve seat 7 surrounding the orifice provided through the body of the section. The wall 5 of the recess is provided with a groove 5a adapted to provide a locking cavity for a portion of a novel valve varrier designated generally as D.

As will be observed from the drawing, the valve carrier D preferably consists of a spring or resilient body portion 8 which is split as indicated at 9. This construction provides for the contraction of the ring when the tool engaging projections 10 at opposite sides of the split portion are engaged by a suitable tool to contract the ring sufficiently to permit the rib 5b on the body 8 to be sprung into interlocking engagement with the groove 5a previously referred to. The body of the ring is also provided with the offset bearing portions 11 adapted to receive a pin or shaft 12 on which a check valve E is loosely mounted for swinging movement.

The valve unit including the valve E and its supporting ring 8 are clearly shown in Figure 3 detached from the section A, while Figure 1 shows the valve unit assembled. With the parts in the position shown in Figure 1, it will be apparent that flow in the pipe line may proceed freely in the direction of the arrows, but if flow occurs in the reverse direction the valve E will be firmly pressed against the seat 7. Should it become necessary to inspect the valve assembly and either repair or replace any of the valve parts, it is only necessary to loosen the nut C in Figure 1 and slightly separate the sections A and B thereby to permit immediate access to the valve.

By applying a tool, such for example as a pair of pliers to the members 10, the ring 8 may be contracted so that the rib 5b may be disengaged from the groove 5a and the entire assembly may be removed. Furthermore, access may be had to the valve seat 7 for purposes of regrinding, if desired.

From the foregoing it will be apparent that the present construction provides a simple and expeditious manner of not only connecting the pipe sections but likewise facilitates the accessibility to the valve with a minimum number of operations and with a minimum number of parts. Practically the invention has special utility in connection with oil lines or steam lines where efficient check valve surfacing is required and the efficiency of the valves must be maintained at all times.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A combined pipe union and check valve device including pipe engaging members, one of which is formed with a recess and the wall of said recess being provided with a groove, a nut for separably connecting said members, a valve seat in the bottom of said recess, a split ring having an external rib adapted to fit in said groove and a valve pivotally mounted in said ring.

2. A combined pipe union and check valve device including pipe engaging sections, a nut separably connecting the same, a valve seat in one of said members, and a valve unit detachably interlocked with said section having the valve seat therein, said valve unit comprising a split resilient body provided on its outer wall with means for interlocking with the section to which it is fitted, tool engaging portions offset from the body of the ring adjacent the split portion thereof, bearing projections also offset from the same side of the valve body as the tool engaging projections, a pivot pin supported in said bearing projections, and a valve pivotally mounted on said pin.

FRED R. LONG.